United States Patent [19]
Lafay et al.

[11] Patent Number: 4,919,820
[45] Date of Patent: Apr. 24, 1990

[54] OIL ABSORPTION METHOD

[76] Inventors: William T. Lafay, 2629 Manhattan Ave., Hermosa Beach, Calif. 90254; William F. Meistrell, 669 Seventeenth St., Manhattan Beach, Calif. 90266

[21] Appl. No.: 339,259
[22] Filed: Apr. 17, 1989
[51] Int. Cl.$^5$ .......................... C02F 1/28; E02B 15/04
[52] U.S. Cl. .................................. 210/671; 210/691; 210/242.4; 210/924
[58] Field of Search ............ 210/671, 680, 691, 242.4, 210/924

[56] References Cited

U.S. PATENT DOCUMENTS 3,679,058  7/1972  Smith ............................... 210/242.4
4,439,324  3/1984  Crotti ................................. 210/924
4,512,890  4/1985  Medbury .......................... 210/494.1

Primary Examiner—Ivars Cintins
Attorney, Agent, or Firm—William W. Haefliger

[57] ABSTRACT

The method of removing oil from a body of water that includes providing a flexible mesh container, and filling waterfowl feathers into the container, introducing the feather filled mesh container into contact with the oil near or at the surface of the water body, allowing absorption of the oil through the mesh into the feathers in the container, and removing the container from the body of water, for disposition of the absorbed oil. Reclamation of the oil may be effected by squeezing the container and feathers therein to separate oil from the feathers, and collecting the separated oil.

3 Claims, 2 Drawing Sheets

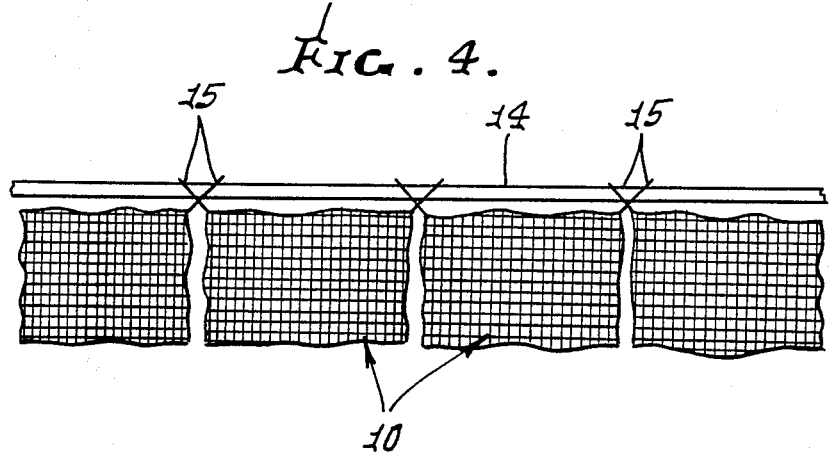
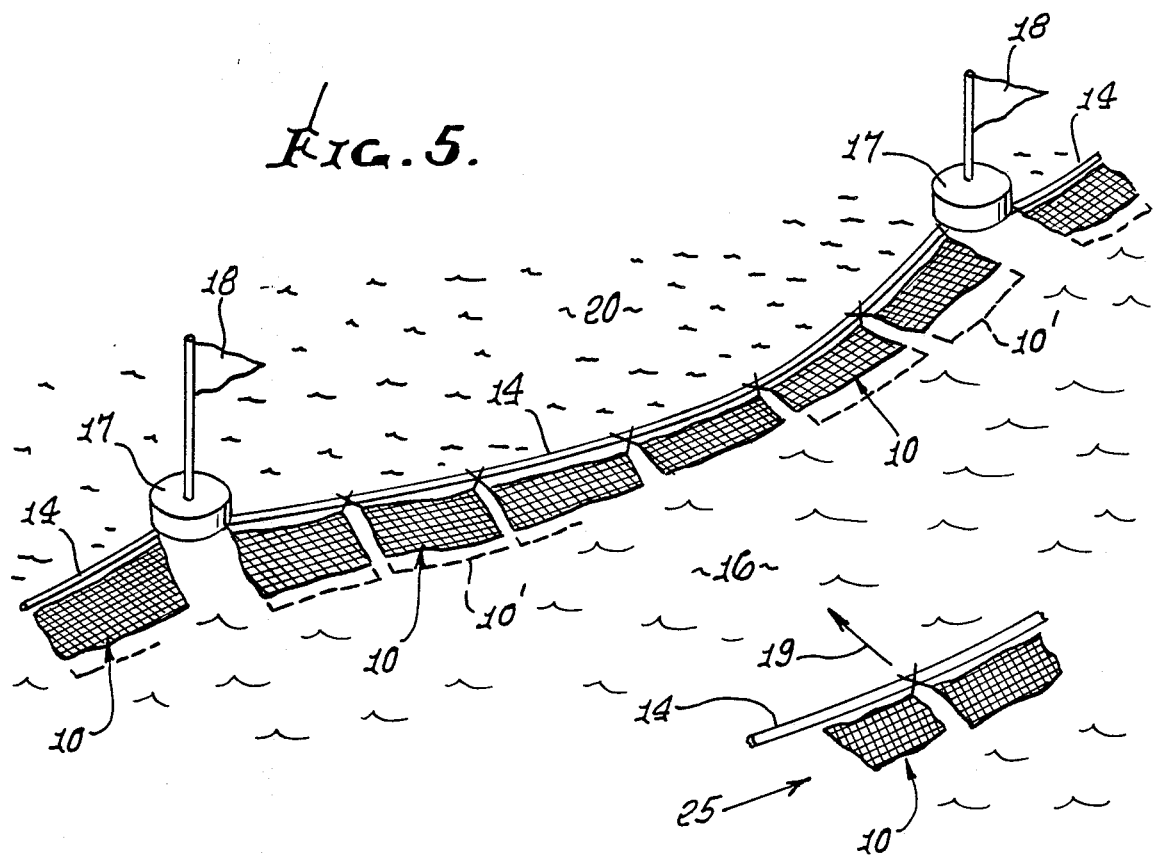
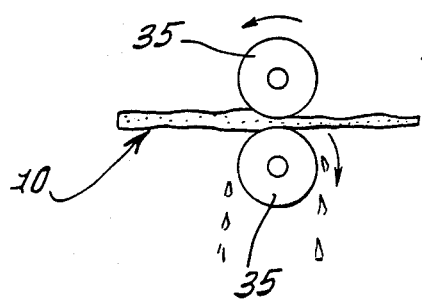

OIL ABSORPTION METHOD

BACKGROUND OF THE INVENTION

This invention relates generally to oil or petroleum clean-up, and removal, as from bodies of water, and more particularly, to the efficient use of oil absorbent waterfowl feathers for this purpose.

Rapid removal of petroleum from water bodies, of as after an oil spill from a tanker vessel, has become crucial importance to protect the environment. Reference is made to the Valdez, Ak., spill, in 1989, in this regard. There is a clear and compelling need for apparatus to enable efficient removal of such oil. While plastic booms have been used, they generally serve to confine floating oil in an area, and become of less use as the oil dissipates, hardens, or drops in the water. There is need for apparatus that will rapidly and efficiently absorb the floating oil, while also confining it as the oil is being absorbed, i.e., a double function means. Oil-consuming microbes do not permit reaccess to the oil removal from the water body, i.e., the oil is lost.

SUMMARY OF THE INVENTION

A major object of the invention is to provide method and means to meet the above need. Basically, the method of the invention involves performing the steps that include:

(a) providing a flexible mesh container, and filling waterfowl feathers into the container, and (b) introducing the feather filled mesh container into contact with the oil near or at the surface of the water body, and (c) allowing absorption of the oil through the mesh into the feathers in the container, and (d) removing the container from the body of water, for disposition of the absorbed oil.

Further steps comprise squeezing the container and feathers therein to separate oil from the feathers, and collecting the separated oil. A series of such containers, with feathers therein, may be provided by connecting them end-to-end, or in end-to-end relation as by means of a cable, thereby allowing their deployment as a boom which confines or contains floating oil, while also rapidly and efficiently absorbing it before the oil dissipates or drops in the sea. A succession of such booms can be provided and advanced toward the oil, and as each becomes oil-saturated, it is removed for reconstitution (as by squeeze removal of oil from the feathers in each container) and reuse.

These and other objects and advantages of the invention, as well as the details of an illustrative embodiment, will be more fully understood from the following specification and drawings, in which:

DRAWING DESCRIPTION

FIG. 4 is a plan view showing a series of devices as seen in FIG. 1 attached to a line or cable;

FIG. 5 is a perspective view, showing the FIG. 4 cable supported device deployed on a body of water to absorb oil on the water body, with floats connected to the line.

FIG. 6 shows a device squeezing operation to remove oil from the feathers, enabling reuse of the device.

DETAIL DESCRIPTION

Figure 1:
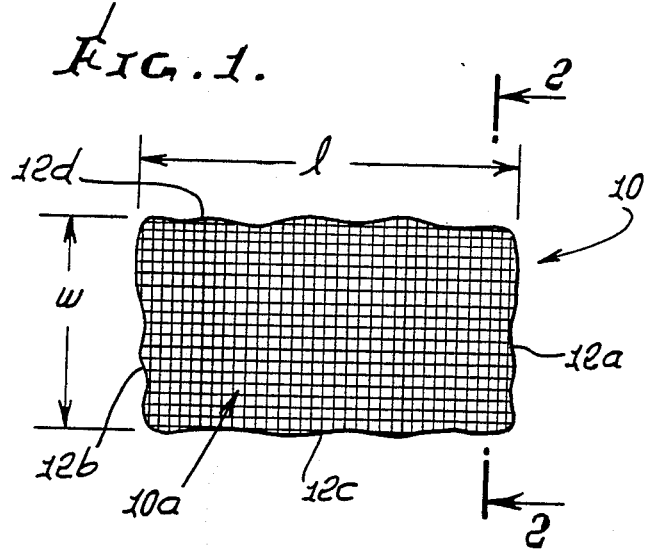
FIG. 1 is a plan view of oil absorbing apparatus incorporating the invention.
Figure 2:
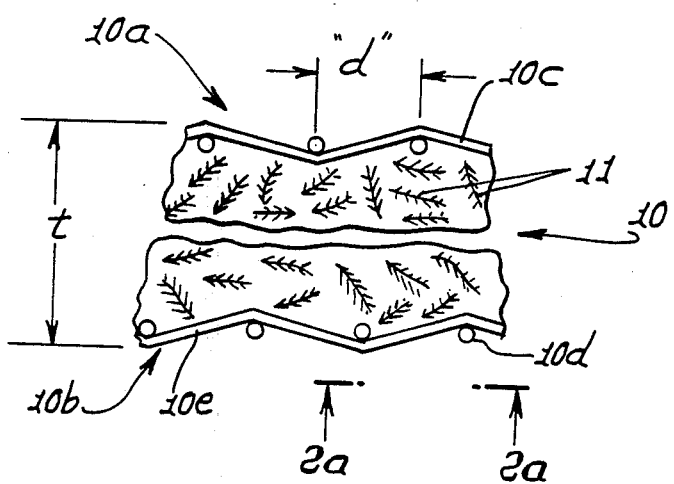
FIG. 2 is an enlarged section taken on lines 2—2 of FIG. 1.
Figure 2A:
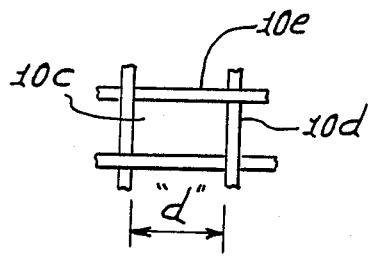
FIG. 2a shows a mesh configuration of the container.

In FIGS. 1, 2, and 2a, a flexible mesh container 10 has two flexible sides or walls 10a and 10b, each of mesh material, and forming openings 10c between warp and woof strands 10d and 10e. The latter may consist of plastic stringers, and they may be woven, or joined together in a single plane. The mesh size "d" is such that approximately 3/16 inch square openings 10c are formed by the strands. Slightly larger or smaller openings are usable. The bag or container may have length "l" of about 32 inches and width "w" of about 18 inches, these being practical examples. Bag size ranges from 12 inches by 24 inches, to 24 inches by 40 inches.

Waterfowl feathers 11 are filled into the bag, and its edges at 12a-12d are closed. The resulting bag thickness is about 1½ to 3 inches. The feathers, being larger than the mesh openings, cannot escape. Yet, the mesh freely allows water to enter the porous container, and ready absorption of oil through the mesh into the feathers, the latter having exceptional oil absorption capacity, as packed into the bag, against the mesh, to contact oil through the mesh.

For example, a bag of the size referred to (18 by 32 inches) containing about ½ pound of duck feathers can readily absorb 10 to 20 pounds of oil, such as petroleum, in its condition found after an oil spill on a body of water, such as sea water. Further, the feathers and bag readily give up and discharge their oil absorbed contents, when squeezed, as for example between rollers 35 as seen in FIG. 6 showing an oil filled bag of feathers being passed between the rotating rollers. As a result, the bag and feathers are reconstituted and ready for reuse to absorb oil on the body of water. Tests show that the amount of oil that a reconstituted feather filled mesh bag can absorb is about 80% to 90% of the amount of oil absorbed initially.

Figure 3:
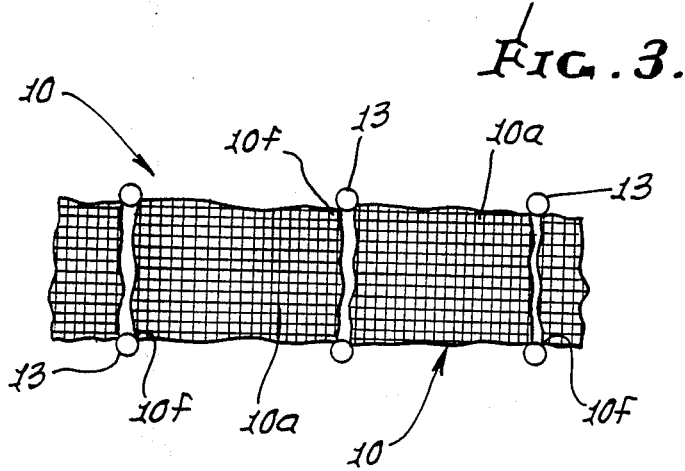
FIG. 3 is a plan view showing end-to-end interconnection of a series of oil absorbing devices as seen in FIG. 1.

FIG. 3 shows a series of such feather-filled porous mesh bags or containers 10 connected end-to-end, as by connectors 13 at the bag corners 10a. This establishes a long line of such oil absorbing units that can be deployed as a boom on a water body, for absorbing the oil. FIG. 4 shows a cable or line 14 to which such containers 10 are corner connected. Note the cross-over connectors 15 joining successive bags to the cable to keep the successive bag in adjacent relation, along the cable.

FIG. 5 shows the line 14 deployed on a body of water 16, such as the sea, the bags of feathers partly floating and partly submerged (see 10 and broken lines 10'). Floats 17 on the water support opposite ends of the line 14, and flags 18 on the floats show their locations. Oil in a slick is shown at 20, at one side of the line and row of feather-filled bags. The line 14 may be detached from the floats along with attached bags for removal of absorbed oil from the feathers, and then redeployed, as described.

The next in series absorber boom is advanced to the remaining oil (see arrow 19), so that successive booms become effective, one by one, to remove the oil. See the next boom at 25 in FIG. 5, advancing toward the first boom at the edge of the oil slick. This procedure removes the oil along a "front", and a succession of oil boom "fronts".

As used herein, the term "oil" refers to petroleum, and oil or petroleum-like substances, or oil or petroleum-based substances, particularly those absorbed by waterfowl feathers.

I claim:

1. The method of removing oil from a body of water that includes:
   (a) providing multiple flexible mesh containers, and filling duck feathers into each container, the mesh size of the container being about 3/16 inch, the duck feathers packed against the mesh at the inside of the container, and interconnecting said containers in series and connecting float means to the series of containers, in series therewith,
   (b) introducing the feather filled mesh containers into the water body for deployment into contact with the oil near or at the surface of the water body, and advancing the series of containers as a front, toward and into an oil slick on the body of water,
   (c) allowing absorption of the oil through the mesh into the feathers in each container,
   (d) removing each container from the body of water, for disposition of the absorbed oil,
   (e) and including squeezing each container and feathers therein to separate oil from the feathers, and collecting the separated oil,
   (f) and including reusing said feather-filled containers from which oil has been squeezed, by reintroducing the series of containers into oil at or near the surface of the water body for oil absorption by the feathers, and again removing the containers from the body of water for disposition of the absorbed oil,
   (g) each container provided to be between 12 and 24 inches long, and between 24 and 40 inches wide.

2. The method of claim 1 including providing and advancing a second series of such containers, as a second and fresh front, toward and into the oil slick, from which the first referenced containers have been removed, for continued oil absorption and removal from the slick for reclamation of such oil.

3. The method of claim 1 wherein the containers are each packed to contain about ½ pound of duck feathers.

* * * * *